Sept. 29, 1959 P. DEREN 2,906,624
APPARATUS AND METHOD FOR EXTRACTING AIR FROM BEVERAGES
Filed March 18, 1954
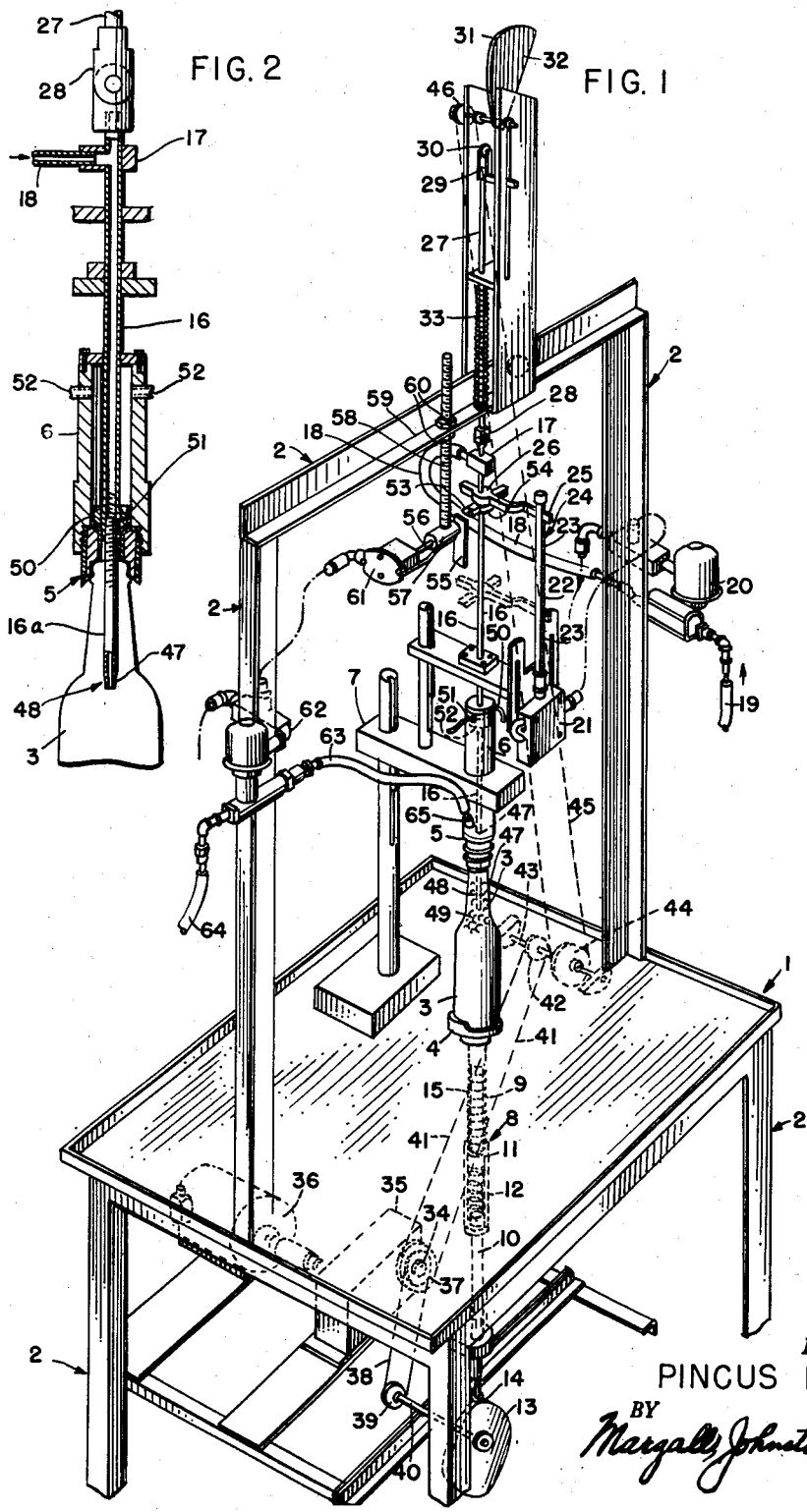
INVENTOR:
PINCUS DEREN
BY
Margall, Johnston, Cook & Root
ATT'YS

United States Patent Office 2,906,624
Patented Sept. 29, 1959

2,906,624

APPARATUS AND METHOD FOR EXTRACTING AIR FROM BEVERAGES

Pincus Deren, Milwaukee, Wis., assignor to Pabst Brewing Company, Milwaukee, Wis., a corporation of Delaware Application March 18, 1954, Serial No. 416,990

10 Claims. (Cl. 99—79)

This invention relates to an apparatus and method for bottling beverages.

The present invention consists in the method or process of controlling the air content of carbonated beverages, especially bottled beer, and to the apparatus for carrying out the process.

It is well known that conventional practices in bottling carbonated beverages, particularly beer, causes a certain amount of oxidation of some of the constituents of the product, resulting in an undesirable change in flavor and in accelerated instability which greatly reduces the shelf life of the beverage.

Numerous attempts were made to eliminate the excess air, and it was found that to remove the excess air successfully it was necessary to cause the beverage to foam and permit the latter to rise in the neck of the bottle to expel the air above the liquid level. Also, it was found that, to achieve good results, enough of the foam must be formed to fill the neck with fine bubbles to the top of the rim of the bottle neck.

One means for producing foam is by "knocking" the bottle sufficiently to cause the release of the gas in the beer; another means is by "jetting" or squirting a stream of beer into the beer in the bottle after it has been filled. A third method is by the injection of a stream of $CO_2$ gas into the liquid.

Control of the degree of foaming by the methods just described is very difficult. When the knocking procedure is used, the condition of the surface of the bottle influences the degree of foaming. When jetting, either with beer or with $CO_2$ gas, the liquid content is disturbed, and small variations in the temperature of the product and on the inside surface of the container will result in different degrees of foaming. The uncontrolled foaming results in either great variations in the final air content, or in the loss of large quantities of beer.

The primary object of the present invention is to overcome the disadvantages inherent in the conventional methods, and to provide new, novel and improved means, which are positive and flexible, to produce foam and to control the foam after it has been formed or produced.

Another object of the invention resides in the provision of novel means for removing most of the air before the foam is formed.

A further object is to reduce the losses of beverage due to excessive foaming and thereby practically eliminate so-called "short fills."

A still further object resides in the provision of novel means for creating instantaneous suction on the liquid just as the foam starts to form to facilitate the removal of air.

Still another object of the invention consists in the provision of a new and novel apparatus to permit the process and the steps thereof to be accomplished and carried out successfully.

Numerous other objects and advantages will be apparent throughout the progress of the specification.

The accompanying drawing illustrates a selected embodiment of the invention and the views therein are as follows:

Fig. 1 is a detail isometric view disclosing one form of apparatus which may be used in accomplishing the results desired, and for carrying out the various steps of the method or process; and Fig. 2 is a detail vertical sectional view of certain of the parts of the apparatus.

The specific embodiment herein disclosed for the purpose of describing the apparatus and the manner in which the method or process of the invention may be carried out, comprises a support or base 1 including certain framework and supporting structure 2.

A bottle 3, containing a carbonated beverage, such as beer, is placed in a receptacle or holder 4 which is adapted to position the bottle into sealing contact with a sealing socket element 5. The sealing socket element 5 is secured in airtight relationship with the bottom of a cylinder 6 which is carried by a part 7 adjustably mounted on a part of the framework or structure 2, such as the vertical rod shown in Fig. 1.

The bottle 3, on the receptacle 4, is adapted to be brought into raised position by means of lower mechanism 8 which includes an upper rod 9, a lower rod 10, and an encircling collar or sleeve 11. The sleeve or collar 11 receives the ends of the rods 9 and 10, there being a spring 12 interposed between the said ends to provide spring pressure against a rotary operating cam 13. The lower end of the rod 10 is bifurcated and carries a cam follower roller 14 which engages the periphery of the cam 13. During operation of the cam 13, the rods 9 and 10 will cause the bottle holder 4 to be raised and lowered. A spring 15 is arranged between the sleeve or collar 11 and the underside of the receptacle 4 to permit the bottle to be pulled down. The parts 9 to 12 are constructed and arranged to control the pressure of the rim of the neck of the bottle 3 against the rubber of the sealing socket element 5.

A hollow tube 16 has a lower separate end 16a, Fig. 2, which is adapted to project downwardly through the bottom of the cylinder 6 a predetermined distance to permit its extreme tip end to be projected into the liquid at the upper end of the neck of the bottle 3 after the bottle has been moved to sealing engagement with the socket element 5.

The lower end 16a is threaded into the lower end of the tube 16 proper to permit vertical adjustment. Also, the sealing socket element 5 is threaded into the lower end of a part of the cylinder 6 to provide for further vertical adjustment, Fig. 2. The upper end of the hollow tube 16 has communication with a hollow member 17 which is arranged at the upper end of the tube 16. A pipeline 18, which is connected to the member 17, has communication with a chamber inside of the member 17, the chamber also having communication with the tube 16.

The line 18 is adapted to receive carbon dioxide gas ($CO_2$) from a pipe line 19 which leads to the source of $CO_2$ gas supply. A valve 20 is interposed between the pipe lines 18 and 19 to permit, or prevent, the flow of gas from the pipe line 19 into the hollow member 17, depending upon whether the valve 20 is in opened or closed position. When the valve 20 is in opened position, the flow of gas will be through the line 18 into the chamber of the member 17, and thence down through the hollow tube 16 into the cylinder 6, and finally into the fluid in the neck of the bottle 3. The gas flow may be so timed that the flow through 16a, Fig. 2, may start when the opening of the latter is below cylinder 6.

The operation of the valve 20 is controlled by means of a microswitch 21 whose operation is controlled by a spring 22. The spring 22 is arranged within a hollow rod 23 which is provided with opposed longitudinal slots 24. An arm 25 extends through the opposed slots 24 and engages the upper end of the spring 22 to depress the spring 22 to energize the microswitch 21 when the spring is pressed a predetermined amount. The arm 25 is operated by an extension on a member 26 which is secured to the tubular member 16 at a position below the hollow member 17. The member 26 is adapted to be raised or lowered by means of a rod 27 which is connected to a fitting 28 on the upper end of the hollow rod or tube 16. The upper end of the rod 27 carries a bifurcated member 29 to which a roller 30 is revolubly mounted. The roller 30 is adapted to be contacted by a peripheral part 31 of a cam 32 during rotation of the cam 32. A spring 33 is adapted to assist the roller 30 and the tube 16 to be held in an upward position, the spring 33 being compressed when the cam part 31 of the cam 32 contacts the roller 30. When the operating part 31 of the cam 32 engages the cam roller 30, it will cause the rod 27 and consequently the tube 16 to be moved downwardly against the tension of the spring 33. The spring 33 is adapted to assist in raising the rod 27 and the connected tube 16 to the upward extent of travel.

The cam 32 is adapted to be operated from a shaft 34, which also drives the cam 13, whereby the cam 32 and the cam 13 are operated in proper synchronized time relation. The shaft 34 is driven by change gear or gear reduction mechanism 35 operated by an electric motor 36. The shaft 34 carries a sprocket 37 which operates a sprocket chain 38 trained over a sprocket 39 on a cam shaft 40 carrying the cam 13.

The cam 32 is operated from the shaft 34 by means of a sprocket chain 41 trained over a sprocket on the shaft 34 and a sprocket 42 on a stub shaft 43. The shaft 43 drives a sprocket 44, which in turn drives a sprocket chain 45 which also passes over a sprocket 46 on the transverse shaft upon which the cam 32 is mounted. The motor 36, therefore, drives the cam 32 in synchronized proper timed relationship with the cam 13 through the chain and sprocket construction just described.

The size, construction and operating speed of the cams 32 and 13 are such that as the bottle 3 moves upwardly to be brought into raised position for sealing engagement with the socket member 5, the cam 32 will be forcing the cam roller 30 against the action of the spring 33 and lower the rod 27 and tube 16. As the rod 27 is moved downwardly by the cam 32, the tube 16 will also move downwardly, whereby the lower end 47 of the tube 16 will be moved down into the cylinder 6. The downward movement of the tube 16 causes the operating member 26 to move downwardly also, causing the arm 25 to depress the spring 22. After the spring 22 has been pressed downwardly a certain amount to effect sufficient pressure on the microswitch 21, the microswitch 21 will operate and open the valve 20. The opening of the valve 20 permits gas to flow from the source of supply through the line 19, the valve 20, into the hollow member 17, and then into the hollow tube 16. The downward movement of the tube 16, with the gas flowing through opening means 48 provided in the lower end 47, first blows out the cylinder 6, and then the neck of the bottle 3, and finally when the end of the tube 16 reaches its lowermost position, as shown in full lines in Fig. 2, a stream or jet $CO_2$ gas will be injected into the fluid in the bottle causing the carbonated beverage in the bottle to produce foam 49, Fig. 1.

The cylinder 6 has a piston 50 arranged therein, and is movable in the cylinder as the tube 16 is raised and lowered. The piston 50 has a valve 51 provided therein to allow free operation of the piston without creating any pressure during the downward movement thereof. Ports 52 are provided in the wall of the cylinder 6 to permit free movement of the piston during its upward stroke.

An additional source of $CO_2$ gas, at a pressure greater than the pressure of the gas entering into the tube 16, is provided after the initial foaming operation, to create a pressure on the foam and thus rid the bottle neck of any air which may be therein. A spring latch 53 is mounted on a crosspiece or member 54 which is secured to the tube 16 immediately below the operating arm 26. The latch 53 is pivotally mounted and has a rounded nose which permits the latch to slide freely on a plate 55 during downward movement of the tube 16 upon which the latch is mounted. In a reverse direction the latch becomes operative, that is, it will engage the plate 55 and cause the plate to be pressed inwardly. The plate 55 is an operating member which is secured to a rod 56 passing through a sleeve-like bearing on supporting member 57, the member 57 being supported by a threaded rod 58 adjustably mounted on a support 59 of the framework 2. Lock nuts 60, 60 hold the threaded member 57 in adjusted locked position. The operation of the plate 55, that is, the inward movement of the plate 55, operates a microswitch 61 when the tube 16 moves upwardly by reason of the engagement of the latch 53 with the plate 55.

The microswitch 61, which is operated by the rod 56, operates a valve 62 interposed between a pipe line 63, and a pipe line 64 leading to a source of $CO_2$ gas. The end of the pipe line 63 discharges through a neck 65 leading to the interior of the cylinder 6. The pressure through the lines 64, 63 is greater than the pressure through the lines 19 and 18 and creates a pressure on the bubbles of the foam 49, bursting the bubbles and driving out all air in the neck of the bottle. The higher pressure not only bursts the larger bubbles but also momentarily compresses the foam, stabilizing it to prevent excessive foaming after the bottles leave the sealing socket element 5.

The higher pressure gas entering the cylinder 6 is such that it tends to raise the position 50, and even though the piston rises there is sufficient pressure in the cylinder to cause pressure on the foam as well as to assist in causing the piston itself to rise. The complete operation of blowing out the cylinder 6 by the tube 16, the injection of the gas into the bottle to cause foaming, the pressure on the foam to get rid of air is a relatively quick cycle as various parts are in operation during the several operations.

The depth to which the end 47 of the tube 16 penetrates into the liquid is adjustable by reason of the lower end of the tube being threaded into the main part proper of the tube, and the threaded engagement of the cylinder 6 with respect to the framework member 7. The member 25 is adapted to be adjusted, as are the several other operating members such as the members 21, 23, 25, 26, 55 and others. The cam 32, while rotating synchronously with respect to the cam 13, only engages the roller 30 when the high part of the periphery is in position to operate the roller in a downward position, the pressure in the cylinder 6 being assisted by the spring 33, if necessary, to raise the tube.

A complete cycle of operation consists in first placing a bottle 3 on the receptacle or holder 4 as the bottle is being raised by means of the cam 13. As the bottle is being raised upwardly toward sealing engagement with the sealing socket 5, the cam 31 is in position to engage the cam roller 30 to move the tube 16 downwardly and blow out the cylinder, the air passing out through the valve 51 in the piston and thence through the ports 52. The continued downward movement of the tube 16 permits gas to be injected into the liquid to cause foaming. The instant this is accomplished, there will be an instantaneous suction on the liquid just as the foam starts to foam, thereby facilitating removal of air. The latch 53 will then have reached the position to operate the member 55 to operate the microswitch 61 to open the valve 62. The tube 16 is now moving upwardly by the higher pressure gas coming through the line 63, assisted by the spring 33 if necessary.

The introduction of the high pressure gas into the cylinder causes a pressure in the bottle neck, bursting the bubbles and causing air in the neck to be dispelled out of the cylinder. The timing is such that when the high pressure is ready to enter the cylinder the tube 16 will have raised sufficiently to permit the valve 20 to close. The cam 13 is then in position to permit the bottle to be lowered to position and then capped with all air dispelled. The cycle then is repeated.

A jet of beer, instead of a non-toxic oxygen-free gas alone, can be passed through tube 16 to cause the foam to form. The higher $CO_2$ pressure still functions to burst the bubbles and compress the foam.

The operation may be as fast as practical and as many of the devices may be used as are expeditious. The device is relatively simple in construction and the operation thereof is so synchronized and timed as to effect the proper operations in the proper sequences. Also, the method of extracting the air from the bottle is done quickly, efficiently and inexpensively. The invention is adapted for use in existing filling machines as well as for newly designed machines.

The invention controls the air content left in the beverage-filled bottles, but before sealing them, whereby the residual air is withdrawn and the beverage is left in good and proper condition.

Changes may be made in the form, construction and arrangement of the parts, and the method or process may be varied within certain limits and degrees, without departing from the spirit of the invention or sacrificing any of its advantages, and the right is hereby reserved to make all such changes as fall fairly within the scope of the claims which follow.

The invention is claimed as follows:

1. The process of removing air from a container containing a carbonated beverage comprising injecting a non-toxic oxygen-free gas into the beverage to cause foaming of the beverage and causing the foam to rise in the container and thereby expel air therefrom, maintaining a closure surrounding the filling opening in the container, and then applying a non-toxic oxygen-free gas through said closure under greater pressure to said foam confined in said container and above the liquid level to burst larger bubbles and momentarily compress the foam to stabilize it and prevent excessive foaming upon removal of the closure, and removing said closure.

2. The process of removing air from a container containing a carbonated beverage comprising injecting a non-toxic oxygen-free gas into the beverage to cause foaming of the beverage and causing the foam to rise in the container and thereby expel air therefrom, maintaining a closure surrounding the filling opening in the container, assisting the expulsion of air by applying reduced pressure through said closure to the container, and then applying a non-toxic oxygen-free gas through said closure under greater pressure to said foam confined in said container and above the liquid level to burst larger bubbles and momentarily compress the foam to stabilize it and prevent excessive foaming upon removal of the closure, and removing said closure.

3. The process of removing air from a container containing a carbonated beverage comprising injecting a non-toxic oxygen-free gas into the container above the liquid line while venting the container, then injecting said gas into the beverage to cause foaming of the beverage and causing the foam to rise in the container and thereby expel air therefrom, maintaining a closure surrounding the filling opening in the container, and then applying a non-toxic oxygen-free gas through said closure under greater pressure to said foam confined in said container and above the liquid level to burst larger bubbles and momentarily compress the foam to stabilize it and prevent excessive foaming upon removal of the closure, and removing said closure.

4. The process of removing air from a container containing a carbonated beverage comprising injecting a non-toxic oxygen-free gas into the container above the liquid line while venting the container, then injecting said gas into the beverage to cause foaming of the beverage and causing the foam to rise in the container and thereby expel air therefrom, maintaining a closure surrounding the filling opening in the container, assisting the expulsion of air by applying reduced pressure through said closure to the container, applying a non-toxic oxygen-free gas through said closure under greater pressure to said foam confined in said container and above the liquid line to burst larger bubbles and momentarily compress the foam to stabilize it and prevent excessive foaming upon removal of the closure, and removing said closure.

5. The process of removing air from above the liquid in a container containing a carbonated beverage which comprises applying a closure to the opening in the container, injecting $CO_2$ gas through the closure into the beverage to cause foaming of the beverage and causing the foam to rise in the container and thereby expel air therefrom through the closure, discontinuing said injection of $CO_2$, then applying $CO_2$ gas under greater pressure to said foam confined in said container and above the liquid line to stabilize the foam therein, and removing said closure.

6. The process of removing air from the neck of a bottle containing beer which comprises bringing the bottle into sealing contact with a closure provided with a vent and means for admitting $CO_2$ gas to the closure from each of two different sources, one of said means comprising a tube mounted for reciprocation from a position with its free end within said closure to a position with its free end immersed in the beer, supplying $CO_2$ gas under a predetermined pressure from one source through said tube and first into said closure, then into the neck of the bottle and then into the beer to cause foaming of the beer, causing the foam to rise in the bottle neck and thereby expel air therefrom, discontinuing said injection of $CO_2$, then supplying $CO_2$ gas under greater pressure from the second source to said closure to thereby apply the gas to said foam confined in said bottle and above the liquid level to stabilize the foam therein, removing said bottle from said sealing contact, and then capping the bottle.

7. An apparatus for eliminating excess air from a container having an opening and containing a predetermined amount of carbonated beverage comprising in combination, a sealing element, means for bringing said container and element into contacting sealing engagement, a hollow tube movable in said sealing element and into said container, means to reciprocate said tube from a position above the liquid level to a position within the beverage, a pipe line communicating with the tube and leading to a source of $CO_2$ gas, a valve in said line, means operated by the reciprocation of the tube to open and close said valve, said valve being open and said gas being injected into the container below the liquid level to cause foaming of the beverage when the tube is reciprocated in one direction, said valve being closed on reverse reciprocation after the foaming operation, a pipe line leading from a second source of $CO_2$ gas under greater pressure for communication with the container through said sealing element, said container being in said sealing engagement, a valve in said latter line, and means operative on said reverse reciprocation of said tube to open said latter valve after the foaming operation.

8. An apparatus for eliminating excess air from a container having an opening and containing a predetermined amount of carbonated beverage comprising in combination, a sealing element, means for relatively moving said container and element into contacting sealing engagement, a hollow tube movable in said sealing element and into said container, means to reciprocate said tube from a position above the liquid level to a position within the beverage, a pipe line communicating with the tube and leading to a source of $CO_2$ gas, a valve in said line, a switch operated by reciprocation of the tube to open and close said valve, said valve being open and said gas being injected into the container below the liquid level to cause foaming of the beverage when the tube has reciprocated to a predetermined position, means to close said valve on reverse reciprocation after a predetermined period of foaming, means leading from a second source of $CO_2$ gas under greater pressure and adapted to flow through said sealing element into the container to compress and stabilize the foam formed by the foaming operation, said container being in said sealing engagement, and valve means controlled by said reverse reciprocation of the tube to permit and then shut off the flow of gas through said latter means, said latter valve means opening when the first valve is closed.

9. An apparatus for eliminating excess air from a container having an opening and containing a predetermined amount of carbonated beverage comprising in combination, a sealing element, means for relatively moving said container and element into contacting sealing engagement, a hollow tube movable in said sealing element and into said container, means to reciprocate said tube from a position above the liquid level to a position within the beverage, a pipe line communicating with the tube and leading to a source of $CO_2$ gas under a predetermined pressure, a valve in said line, a switch operated by reciprocation of the tube to operate said valve to cause opening and closing of the valve, said valve being open and said gas being injected into the container below the liquid level to cause foaming of the beverage when the tube is reciprocated in one direction, means to close said valve on reverse reciprocation after a predetermined period of foaming, a second pipe line leading from a second source of $CO_2$ gas having a pressure greater than said predetermined pressure, said latter gas being in communication with the interior of the container through said sealing element, said container being in said sealing engagement, a second valve interposed in said second line, means to open said second valve upon said reverse reciprocation of the tube after said foaming period, said means to operate each of said valves comprising a microswitch for each valve, means controlled by the reciprocation of said tube to operate said switches, said first named moving means including a cam, means to operate said cam, and means operated by said cam to move the container into sealing engagement with the sealing element, said means to reciprocate said hollow tube including a cam operated in timed relation with the first cam, a rod connected to said tube, a cam follower on said rod, and spring means to normally urge the cam follower toward the second named cam.

10. In a device of the class described, the combination comprising a supporting frame, a container receptacle adapted to receive a container containing a predetermined amount of carbonated beverage, said container having a filling opening therein, a cylinder carrying a sealing socket member, means to effect relative movement of the container and the socket member to make a seal therebetween, a hollow tube adapted to extend into and through said cylinder and into said container, means to reciprocate said tube from a position above the liquid level to a position within the beverage, a source of $CO_2$ gas leading into said tube, means to turn on or shut off said source of gas depending upon the reciprocation of the tube, means leading from a second source of gas under greater pressure and connected to said cylinder for supplying the second gas into said container above the liquid line, and means to control the supply of gas from said second source cooperatively with the supply of gas from said first-named source and depending upon the direction of movement of said tube.

References Cited in the file of this patent
UNITED STATES PATENTS

| | | |
|---|---|---|
| 970,623 | Hemming | Sept. 20, 1910 |
| 1,232,271 | Franks | July 3, 1917 |
| 1,361,498 | Ruff | Dec. 7, 1920 |
| 2,356,498 | Bargeboer | Aug. 22, 1944 |
| 2,684,806 | McBean | July 27, 1954 |

UNITED STATES PATENT OFFICE
CERTIFICATE OF CORRECTION

Patent No. 2,906,624 September 29, 1959

Pincus Deren

It is hereby certified that error appears in the printed specification of the above numbered patent requiring correction and that the said Letters Patent should read as corrected below.

Column 3, line 63, after "jet" insert -- of --; column 4, line 35, for "position" read -- piston --.

Signed and sealed this 5th day of April 1960.

(SEAL)
Attest:

KARL H. AXLINE
Attesting Officer

ROBERT C. WATSON
Commissioner of Patents